(12) United States Patent
Zhang

(10) Patent No.: US 9,255,660 B2
(45) Date of Patent: Feb. 9, 2016

(54) CAMERA FIXING DEVICE

(71) Applicant: Shenzhen AEE Technology Co., Ltd, Shenzhen, Guangdong (CN)

(72) Inventor: Xianzhi Zhang, Shenzhen (CN)

(73) Assignee: SHENZHEN AEE TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 14/364,300

(22) PCT Filed: Nov. 26, 2013

(86) PCT No.: PCT/CN2013/087878
§ 371 (c)(1),
(2) Date: Jun. 11, 2014

(87) PCT Pub. No.: WO2015/000251
PCT Pub. Date: Jan. 8, 2015

(65) Prior Publication Data
US 2015/0192242 A1    Jul. 9, 2015

(30) Foreign Application Priority Data

Jul. 2, 2013  (CN) .......................... 2013 1 0275024

(51) Int. Cl.
*E04G 3/00* (2006.01)
*F16M 11/14* (2006.01)
*F16M 13/02* (2006.01)
*F16M 1/00* (2006.01)

(52) U.S. Cl.
CPC ................. *F16M 11/14* (2013.01); *F16M 1/00* (2013.01); *F16M 13/02* (2013.01)

(58) Field of Classification Search
CPC ............................. F16M 11/14; F16M 13/02
USPC .......... 248/178.1, 181.1, 181.2, 184.1, 187.1, 248/231.41, 231.61, 276.1, 282.1, 284.1; 403/90, 122, 141, 143
See application file for complete search history.

(56) References Cited

U.S. PATENT DOCUMENTS

| | | | | |
|---|---|---|---|---|
| 1,280,013 | A * | 9/1918 | Goddard | 248/181.1 |
| 2,650,788 | A * | 9/1953 | Hulstein | 248/231.71 |
| 5,251,859 | A * | 10/1993 | Cyrell et al. | 248/288.51 |
| 7,458,555 | B2 * | 12/2008 | Mastropaolo et al. | 248/447.2 |
| 8,235,340 | B2 * | 8/2012 | Carnevali | 248/231.71 |
| 8,366,064 | B2 * | 2/2013 | Chen et al. | 248/181.1 |
| 8,487,169 | B2 * | 7/2013 | Dunlop | 84/329 |
| 8,925,877 | B2 * | 1/2015 | Carnevali | 248/122.1 |
| 2008/0061197 | A1* | 3/2008 | Carnevali | 248/181.1 |

* cited by examiner

*Primary Examiner* — Gwendolyn W Baxter

(57) ABSTRACT

A camera fixing device includes a fixing assembly fixed to an external component, a mounting assembly for mounting the camera; and a connection assembly connected between the fixing assembly and the mounting assembly; the connection assembly comprises a first ball head, the mounting assembly comprises a second ball head, a first end of the connection assembly comprises a first receiving space which receives the first ball head and allows the first ball head to rotate therein, and a second end of the connection assembly comprises a second receiving space which receives the second ball head and allows the second ball head to rotate therein. Due to the fact that the ball head can rotate in the corresponding receiving space, the camera fixing device of the present invention can flexibly rotate and realize an omnidirectional shooting in a three-dimension space.

19 Claims, 5 Drawing Sheets

CAMERA FIXING DEVICE

FIELD OF THE INVENTION

The present invention relates to camera technologies, and more particularly, to a camera fixing device.

BACKGROUND OF THE INVENTION

Nowadays, cameras have become an essential item for outdoor trips; since handheld shooting often easily causes blurry picture due to shaking of the camera, a holding device is typically adopted to hold the camera such that the handheld shooting can be avoided.

However, when the camera is mounted in the existing holding device, the shooting direction is often single and the rotation is inflexible, which cannot meet the multi-direction and multi-angle shooting requirement. Moreover, when the holding device is fixed to a smooth object, the stability is poor; in addition, the camera is mounted in the holding device in a simple way, which cannot meet the shooting requirement of high stability in motion.

SUMMARY OF THE INVENTION

A main object of the present invention is to provide a camera fixing device for realizing an omnidirectional shooting in a three-dimension space.

A camera fixing device provided in an embodiment of the present invention includes a fixing assembly fixed to an external component, a mounting assembly for mounting the camera; and a connection assembly connected between the fixing assembly and the mounting assembly; the connection assembly includes a first ball head, the mounting assembly includes a second ball head, a first end of the connection assembly includes a first receiving space which receives the first ball head and allows the first ball head to rotate therein, and a second end of the connection assembly includes a second receiving space which receives the second ball head and allows the second ball head to rotate therein.

Preferably, the connection assembly includes a first connection block, a second connection block opposite to the first connection block, and a first fastening assembly screwing the first connection block and the second connection block together; a first slot and a second slot are respectively formed in two ends of the first connection block, a third slot and a fourth slot are respectively formed in two ends of the second connection block, the third slot engages with the first slot to define the first receiving space, and the fourth slot engages with the second slot to define the second receiving space.

Preferably, a first U-shaped opening is formed in at least one of the first slot and the second slot of the first connection block, and/or a second U-shaped opening is formed in at least one of the third slot and the fourth slot of the second connection block.

Preferably, a wall of at least one of the first slot and third slot is provided with a sawtooth structure, and a wall of at least one of the second slot and the fourth slot is provided with a sawtooth structure.

Preferably, a diameter of the first ball head is equal to that of the second ball head.

Preferably, the first fastening assembly includes a first nut, a first bolt, and a first gasket; the first bolt passes through the first connection block, the second connection block, and the first gasket in this order to engage with the first nut, thereby screwing the first connection block and the second connection block together.

Preferably, the fixing assembly includes a first damper, a second damper opposite to the first damper, and a second fastening assembly screwing the first damper and the second damper together; the first ball head is fixed on the first damper via a connection portion, and the second damper is hinged to the first damper at the connection portion.

Preferably, the fixing assembly includes a third ball head, a connection rod connecting the first ball head and the third ball head, a first damper, a second damper opposite to the first damper, and a second fastening assembly screwing the first damper and the second damper together; a fifth slot is formed in a first end of the first damper, a sixth slot is formed in a first end of the second damper, and the fifth slot engages with the sixth slot to define a third receiving space which receives the third ball head and allows the third ball head to rotate therein.

Preferably, a third U-shaped opening is formed in the fifth slot of the first damper and/or the sixth slot of the second damper.

Preferably, a wall of at least one of the fifth slot and sixth slot is provided with a sawtooth shaped structure.

Preferably, both second ends of the first damper and the second damper have planar structures; or both second ends of the first damper and the second damper have arch structures; or the second end of the first damper has a planar structure and the second end of the second damper has an arch structure; or the second end of the first damper has an arch structure and the second end of the second damper has a planar structure.

Preferably, a flexible rubber pad is formed on at least one of opposite surfaces of the second ends of the first damper and the second damper.

Preferably, a length of the first damper is less than that of the second damper, and a second end of the first damper further includes an adjusting assembly for allowing for a largest contacting area between the fixing assembly and a clamped component.

Preferably, the adjusting assembly includes a third damper with a middle portion thereof being hinged to the second end of the first damper, a first screw rod, a second nut, a first cylinder body hinged to the first damper, and a second cylinder body hinged to a part of the third damper which is located under the first damper; the first cylinder body and the second cylinder body are respectively located on opposite sides of the first damper, a first end of the first screw rod is fixed to the second nut, a second threaded hole conforming to the first screw rod is defined in the first cylinder body, a second end of the first screw rod is fixed to the second cylinder body, and a through hole through which the first screw rod passes to be fixed to the second cylinder body is defined in the first damper.

Preferably, the through hole is greater than the second cylinder body.

Preferably, a flexible rubber pad is formed on at least one of opposite surfaces of the second ends of the second damper and the third damper; or, a flexible rubber pad is formed on the second end of the second damper and/or the third damper is made of flexible material.

Preferably, the adjusting assembly includes a third damper with a middle portion thereof being hinged to the second end of the first damper, a torsion spring, a first screw rod, and a second nut; the torsion spring is formed at the hinged position of the third damper and the first damper to apply a downward force to a part of the third damper which is exposed above the first damper; a first threaded hole conforming to the first screw rod is defined in the first damper; a first end of the first screw rod is fixed to the second nut, and a second end of the first screw rod abuts a part of the first damper which is right located under the first damper.

Preferably, the second fastening assembly includes a third nut and a connection member; the connection member includes a second screw rod having an annular ring on one end thereof and a third cylinder body inserted into the annular ring; a cross hole is defined in the second damper, an elongated hole is defined in the first damper, the connection member passes through the cross hole and the elongated hole to engage with the third nut, thereby screwing the first damper and the second damper together.

Preferably, the first ball head and/or the second ball head and/or the third ball head are hollow.

Preferably, the fixing assembly includes a sucker connected to an external component, the first ball head is formed on the sucker via a connection portion.

The camera fixing device provided in the present invention adjust a shooting angle via the rotation of the first ball head in the first receiving space of the connection assembly and the rotation of the second ball head in the second receiving space of the connection assembly, thereby realizing an omnidirectional shooting in a three-dimension space. Compared with the existing camera fixing device, the camera fixing device in the present invention can flexibly rotate due to the fact the ball head rotates in the corresponding receiving space and realize an omnidirectional shooting in a three-dimension space.

Technical means taken for achieving the intended purposes of the present invention, and functional features and advantages of the present invention are further described below with reference to the accompanying drawings.

DETAILED DESCRIPTION OF THE INVENTION

It is understood that embodiments described herein are only illustrative and are not intended to limit the present invention, and technical features in the present invention can be combined in any way without contradicting each other.

The present invention provides a camera fixing device which is used for fixing the camera in one aspect and for fixing the camera thereon to an external component in another aspect.

Figure 1:
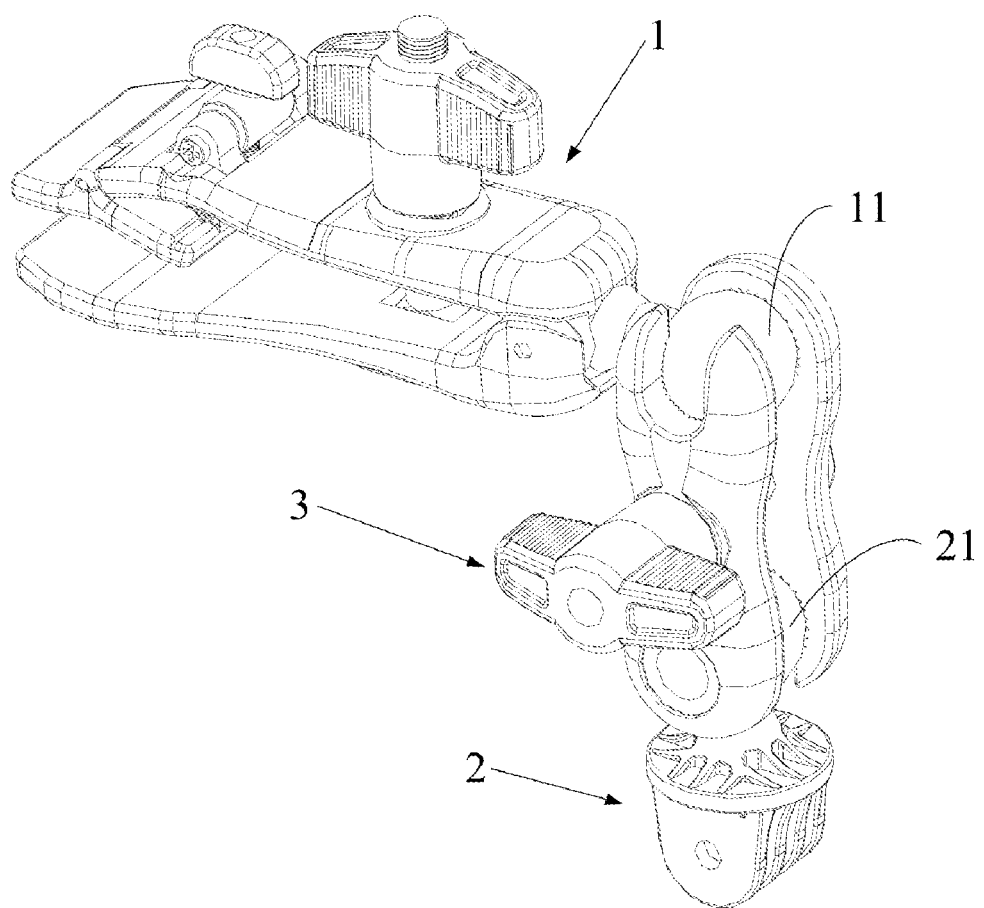
FIG. 1 is a schematic view of a camera fixing device in accordance with an embodiment of the present invention.
Figure 2:
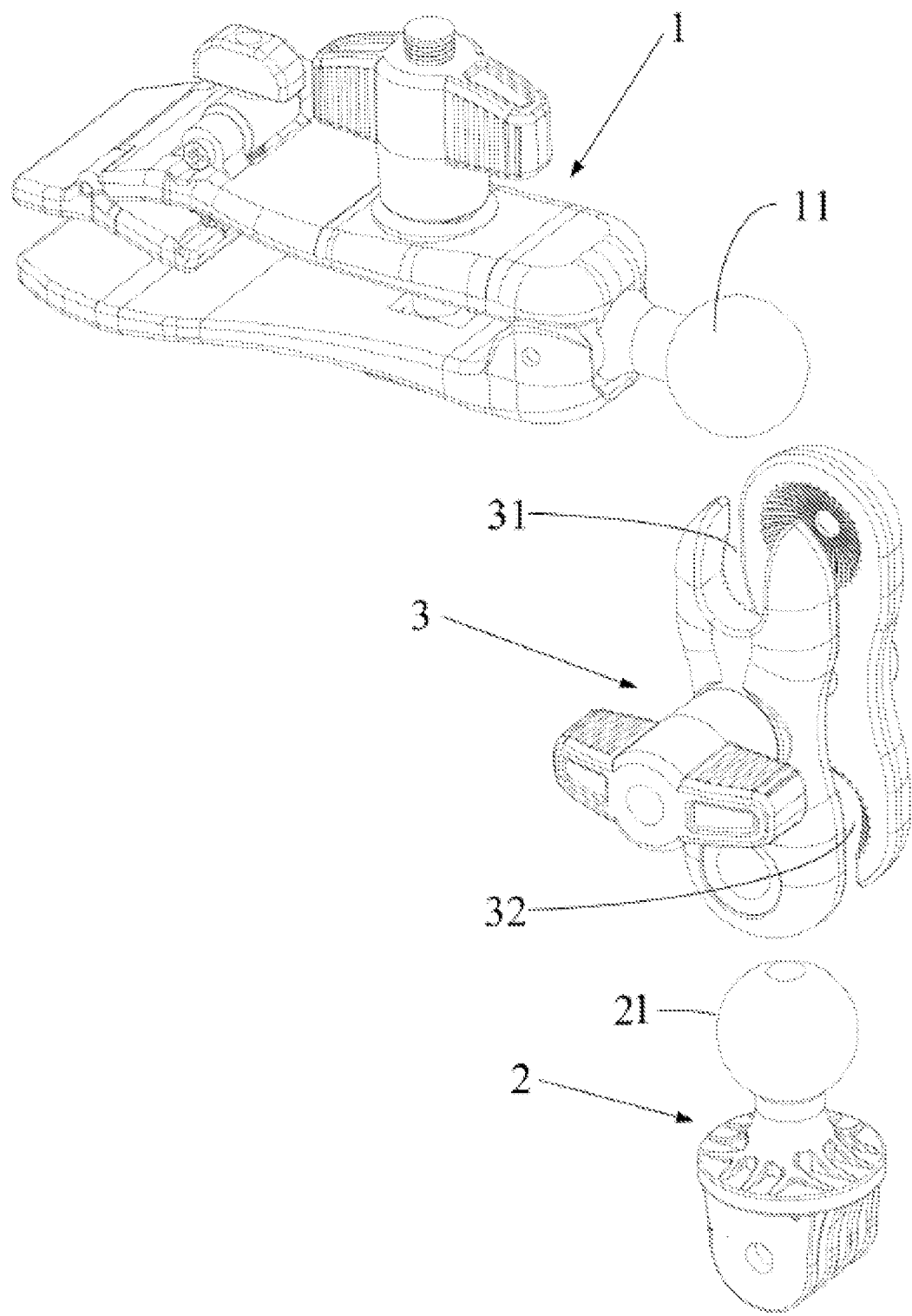
FIG. 2 is an exploded view of the camera fixing device of FIG. 1.

Referring to FIGS. 1 and 2, the camera fixing device disclosed in an embodiment of the present invention includes a fixing assembly 1, a mounting assembly 2, and a connection assembly 3. The fixing assembly 1 is configured to be fixed to an external component (such as a tube-shaped component, a plate-shaped component, or an irregular component). In a specific embodiment, the fixing assembly 1 can be clamped to the external component (like the fixing assembly 1 shown in the drawings) or can be adsorbed onto the external component. The mounting assembly 2 is configured to mount and fix the camera; in a specific embodiment, the camera can be fixed to the mounting assembly 2 by insertion (the mounting assembly 2 shown in the drawings of the invention) or screws. The connection assembly 3 is configured to connect between the fixing assembly 1 and the mounting assembly 2 for connecting the fixing assembly 1 and the mounting assembly 2. In detail, a first ball head 11 is formed on the fixing assembly 1 and a second ball head 21 is formed on the mounting assembly 2; a first end of the connection assembly 3 is connected to the fixing assembly 1 and includes a first receiving space 31 capable of receiving the first ball head 11 and allowing the first ball head 11 to rotate therein; and a second end of the connection assembly 3 is connected to the mounting assembly 2 and includes a second receiving space 32 capable of receiving the second ball head 21 and allowing the second ball head 21 to rotate therein.

The camera fixing device provided in the above embodiment of the present invention can adjust a shooting angle by the rotation of the first ball head 11 of the fixing assembly 1 in the first receiving space 31 of the connection assembly 3, or by the rotation of the second ball head 21 of the mounting assembly 2 in the second receiving space 32 of the connection assembly 3, thereby realizing an omnidirectional shooting in a three-dimension space. Compared with the existing camera fixing device, since the ball head rotates in the corresponding receiving space, the camera fixing device of the present invention can flexibly rotate and realize the omnidirectional shooting in a three-dimension space.

Figure 3:
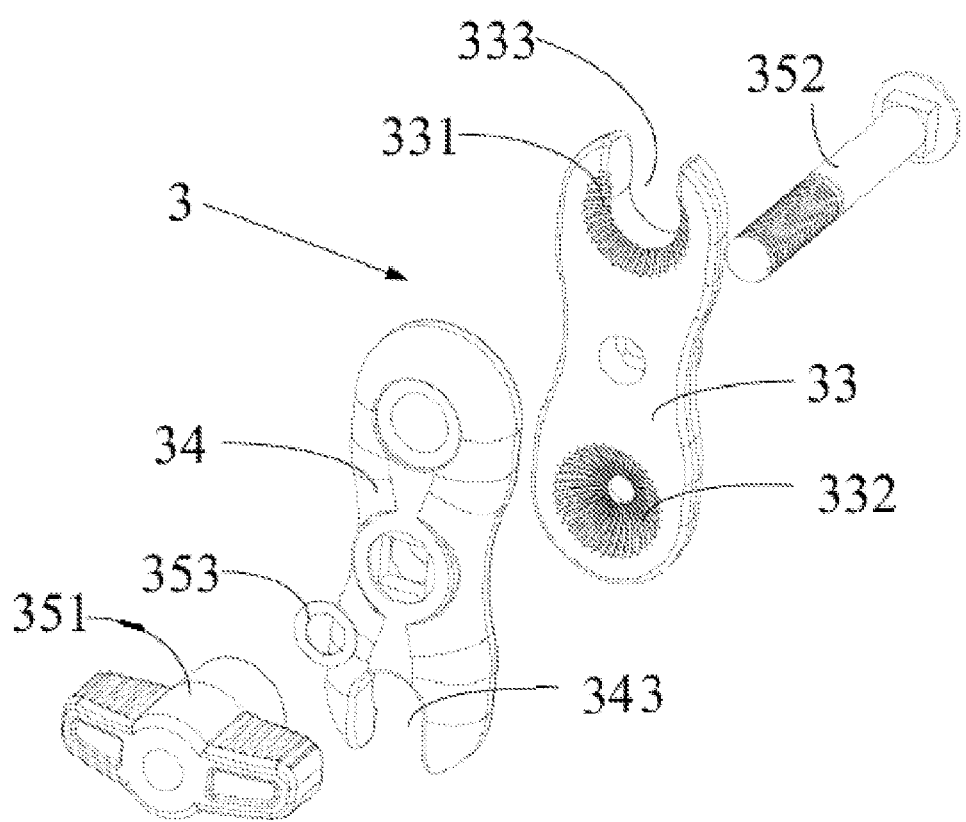
FIG. 3 is an exploded view of a connection assembly of FIG. 1.

In a specific embodiment, with reference to FIG. 3, the connection assembly 3 includes a first connection block 33, a second connection block 34, and a first fastening assembly. The first connection block 33 and the second connection block 34 are opposite to each other, and the first fastening assembly screws the first connection block 33 and the second connection block 34 together. A first slot 331 and a second slot 332 are respectively formed on two ends of the first connection block 33, a third slot and a fourth slot are respectively formed on two ends of the second connection block 34 (since the first connection block 33 is opposite to the second connection block 34, thus, only the first slot 331 and the second slot 332 of the first connection block are visible for illustration in the current drawing). When the first fastening assembly screws the first connection block 33 and the second connection block 34 together, the first slot 331 engages with the third slot to define the first receiving space 31, and the second slot 332 engages with the fourth slot to define the second receiving space 32 of the above embodiment.

Preferably, concave arc surfaces of the first slot 331 and the third slot conform to a spherical surface of the first ball head 11, and the concave arc surfaces of the second slot 332 and the fourth slot conform to a spherical surface of the second ball head 21.

Preferably, a diameter of the first ball head 11 is equal to that of the second ball head 21; at this time, when the first ball head 11 is received in the first receiving space 31 and the second ball head 21 is received in the second receiving space 32, the first connection block 33 is parallel to the second connection block 34. It is noted that according to the design and the functional requirements, the diameter of the first ball head 11 can be unequal to that of the second ball head 21; at this time, it can be easily understood that when the first ball head 11 is received in the first receiving space 31 and the second ball head 21 is received in the second receiving space 32, the first connection block 33 is not parallel to the second connection block 34.

In order to reduce the weight of the connection assembly 3 and further to reduce required material and save cost, and to allow for a larger rotation range of the first ball head 11 in the first receiving space 31 and a larger rotation range of the second ball head 21 in the second receiving space 32, two first U-shaped openings 333 are respectively formed in the first slot 331 and the second slot 332 of the first connection block 33, and two second U-shaped openings 343 are respectively formed in the third slot and the fourth slot of the second connection block 34. In a specific embodiment, in order to stabilize the connection between the first fixing assembly 1 and the connection assembly 3 and the connection between the mounting assembly 2 and the connection assembly 3, preferably, only one U-shaped opening is formed in the engaged first slot 331 and third slot, and only one U-shaped opening is formed in the engaged second slot 332 and fourth slot. Furthermore, in order to reduce the cost of making the moulds of the first connection block 33 and the second connection block 34, the first connection block 33 has the same structure as that of the second connection block 34.

In order to prevent the first ball head 11 from sliding relative to the concave arc surface of the first slot 331 or the third slot and thus to stabilize the connection between the fixing assembly 1 and the connection assembly 3, a wall of at least one of the first slot 331 and the third slot is provided with a sawtooth shaped structure. In a preferable embodiment, both the walls of the first slot 331 and the third slot are provided with the sawtooth shaped structure. Similarly, in order to prevent the second ball head 21 from sliding relative to the concave arc surface of the second slot 332 or the fourth slot and thus to stabilize the connection between the mounting assembly 2 and the connection assembly 3, a wall of at least one of the second slot 332 and the fourth slot is provided with the sawtooth shaped structure. In a preferable embodiment, both the walls of the second slot 332 and the fourth slot are provided with the sawtooth shaped structure.

When the diameter of the first ball head 11 is equal to that of the second ball head 21, the first fastening assembly includes a first nut 351, a first bolt 352, and a first gasket 353. The first bolt 352 passes through the first connection block 33, the second connection block 34, and the first gasket 353 in this order to tightly engage with the first nut 351, thereby screwing the first connection block 33 and the second connection block 34 together (it can be easily understood that holes which allow the first bolt 352 to pass through are respectively defined in the first connection block 33, the second connection block 34, and the first gasket 353). When the first nut 351 is separated from the first bolt 352, the first gasket 353 can prevent the first bolt 352 from being separated from the second connection block 34. When the diameter of the first ball head 11 is unequal to that of the second ball head 21, the first fastening assembly has the same structure as that of the second fastening assembly and the following description of the second fastening assembly can be referred to illustrate the structure of the first fastening assembly, which will not be described herein.

It is noted that in another embodiment, the first connection block 33 can be connected to the second connection block 34 in another way, for example, the first connection block 33 is configured with a stud (a stud with an internal threaded hole), and a screw rod with a nut can pass the second connection block 34 to be tightened to the stud, thereby screwing the first connection block 33 and the second connection block 34 together.

Figure 4:
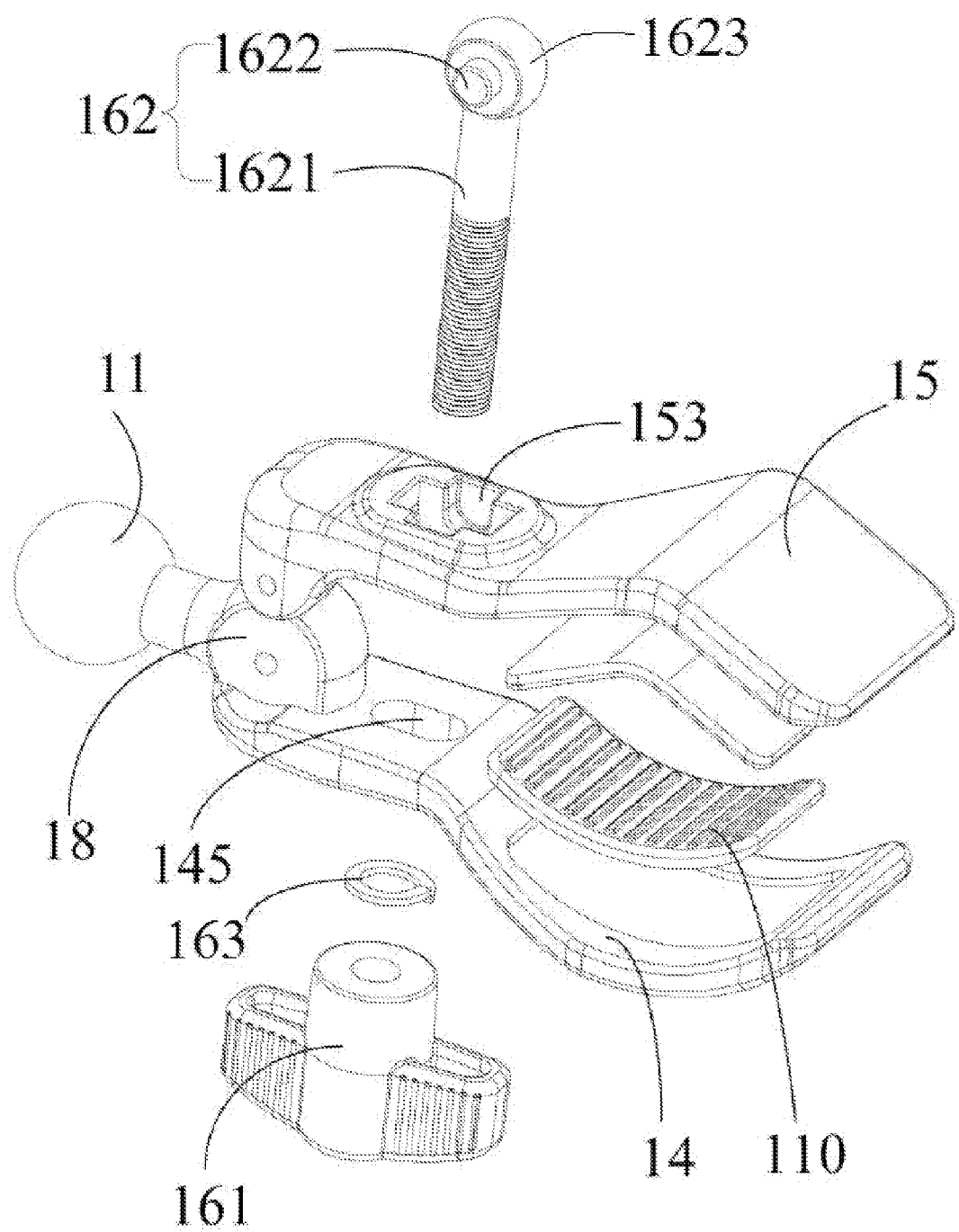
FIG. 4 is an exploded view of a fixing assembly of FIG. 1 in accordance with another embodiment of the present invention.

Please refer to FIG. 4 for the structure of the fixing assembly 1 of any above embodiment. The fixing assembly 1 includes a first damper 14, a second damper 15, and a second fastening assembly. The first damper 14 is opposite to the second damper 15, and the second fastening assembly screws the first clamper 14 and the second damper 15 together. The first ball head 11 is fixed to the first damper 14 via a connection portion 18 (the first ball head 11 herein can be integrally formed with the first damper 14), and the second damper 15 is hinged to the first clamper 14 at the connection portion 18.

Figure 5:
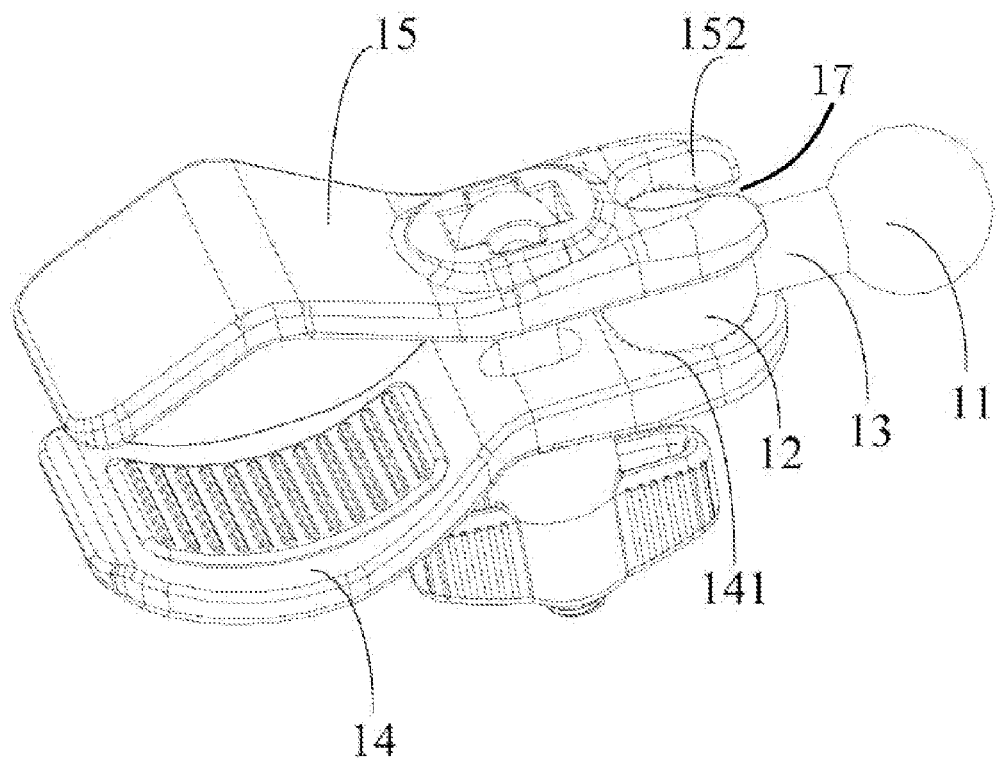
FIG. 5 is an exploded view of a fixing assembly of FIG. 1 in accordance with yet another embodiment of the present invention.

In the above embodiment, the first ball head 11 is fixed to the first damper 14; alternatively, the first ball head 11 can be flexibly connected to the first damper 14. Referring to FIG. 5, the fixing assembly 1 in FIG. 5 includes a third ball head 12, a connection rod 13 connecting the first ball head 11 and the third ball head 12, a first damper 14, a second damper 15, and a second fastening assembly. The first damper 14 is opposite to the second damper 15, and the second fastening assembly screws the first damper 14 and the second damper 15 together. A fifth slot 141 is formed in a first end of the first damper 14 and a sixth slot is formed in a first end of the second damper 15 (since the first damper 14 is opposite to the second damper 15, thus, only the fifth slot 141 is visible for illustration in the first damper 14, and the sixth slot is invisible); when the second fastening assembly screws the first damper 14 and the second damper 15 together, the fifth slot 141 and the sixth slot engage with each other to define a third receiving space (not shown) which receives the third ball head 12 and allows the third ball head 12 to rotate therein.

Preferably, concave arc surfaces of the fifth slot and the sixth slot conform to a spherical surface of the third ball head 12.

In order to reduce the weight of the fixing assembly 1 and further to reduce required material and save cost, and to allow for a larger rotation range of the third ball head 12 in the third receiving space 17, a third U-shaped opening is formed in the fifth slot 141 of the first damper 14, and a U-shaped opening 152 is formed in the sixth slot of the second clamper 15. In a specific embodiment, in order to allows the third ball head 12 to be stably mounted in the third receiving space 17, preferably, only one U-shaped opening is formed in the engaged fifth slot 141 and sixth slot.

In order to prevent the third ball head 12 from sliding relative to the concave arc surface of the fifth slot 141 or the six slot, and to allow the third ball head 12 to be stably mounted in the third receiving space, a wall of at least one of the fifth slot 141 and the sixth slot is provided with a sawtooth shaped structure; preferably, both the walls of the fifth slot 141 and the sixth slot are provided with the sawtooth shaped structure.

Preferably, the first ball head 11, the connection rod 13, and the third ball head 12 are integrally formed; furthermore, in order to facilitate the injection in which the shrinkage may be generated, the first ball head 11, the connection rod 13, and the third ball head 12 are all hollow.

In order to make the fixing assembly 1 be applicable in different scenes, the second ends of the first damper 14 and the second damper 15 are designed to have planar structures to clamp a plate-shaped component; or, the second ends of the first damper 14 and the second damper 15 are designed to have arch structures to clamp an arc component; or the second end of the first damper 14 is designed to have an arch structure and the second end of the second damper 15 is designed to have a planar structure, thereby clamping an irregular component. It is noted that, according to different application scenes, the second ends of the first damper 14 and the second damper 15 can be designed to respectively have any particular shape, which is not limited herein.

In order to protect the clamped external component from damages such as scratches, in a preferable embodiment, a flexible rubber pad 110 is formed on opposite surfaces of the second ends of the first damper 14 and the second damper 15. The flexible rubber pad 110 not only protects the clamped external component, but also stabilizes the clamping of the first damper 14 and the external component or the second damper 15 and the external component. In order to prevent the flexible rubber pad 110 from falling away from the second end of the first damper 14 or the second damper 15, in a specific embodiment, a recess is respectively formed in the second ends of the first damper 14 and the second damper 15 for receiving the corresponding flexible rubber pad 110.

In any above embodiment, a length of the first damper 14 is equal to that of the second damper 15 to stably clamp the external component. It is noted that the length of the first damper 14 can be unequal to that of the second damper 15, for example, in a preferable embodiment, the length of the first damper 14 can be less than that of the second damper 15 or the length of the second damper 15 can be less than that of the first damper 14. The following description is based on that the length of the first damper 14 is less than that of the second damper 15. The fixing assembly 1 further includes an adjusting assembly 19 formed on the second end of the first damper 14 for adjusting the distance between the adjusting assembly 19 and the second damper 15, which allows for the clamping of the external component of any size and ensures a largest contacting area between the clamped external component and the second damper 15 and a third damper 191, thus stably fix the clamped external component and the second damper 15 and the third damper 191.

Figure 6:
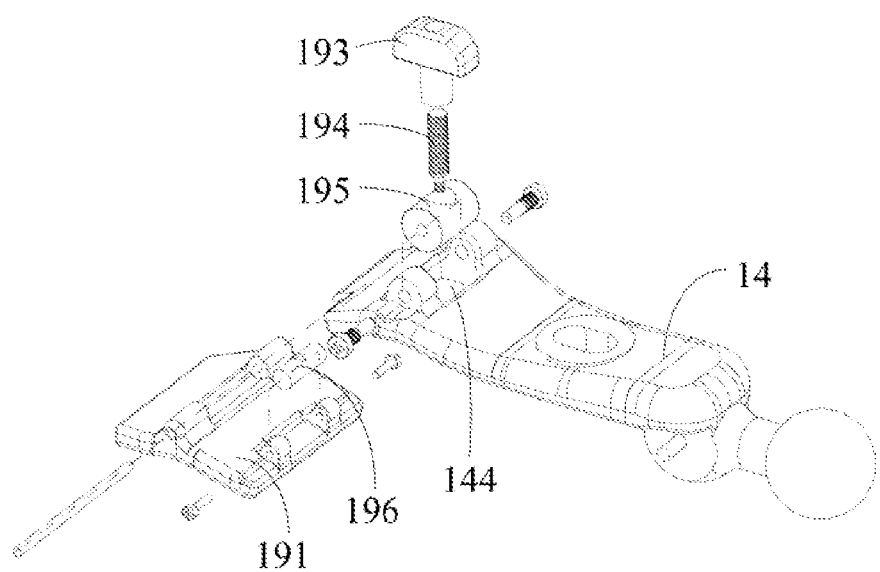
FIG. 6 is an exploded view of the fixing assembly of FIG. 1 without a second damper.

In a specific embodiment, referring to FIG. 6, the adjusting assembly 19 includes the third damper 191, a second nut 193, a first screw rod 194, a first cylinder body 195, and a second cylinder body 196. A middle portion of the third damper 191 is hinged to the second end of the first damper 14, a part of the third damper 191 is located under the first clamper 14, the first cylinder body 195 is hinged to the first clamper 14, the second cylinder body 196 is hinged to the part of the third clamper 191 located under the first clamper, and the first cylinder body 195 and the second cylinder body 196 are respectively located on two opposite sides of the first clamper 14. A first end of the first screw rod 194 is fixed to the second nut 193 which is configured for facilitating the adjustment. A second threaded hole (not shown) conforming to the first screw rod 194 is defined in the first cylinder body 195, a second end of the first screw rod 194 is fixed to the second cylinder body 196, and the first clamper 14 is further provided with a through hole 144 which allows the first screw rod 194 to pass therethrough to be fixed to the second cylinder body 196, namely the first screw rod 194 with the second nut 193 passes through the second threaded hole and the through hole 144 sequentially to be fixed to the second cylinder body 196. When the second nut 193 is turned, the first screw rod 194 moves downwards along an axis of the second threaded hole and thus drives the second cylinder body 196 fixed to the first screw rod 194 and the third clamper 191 being hinged to the second cylinder body to rotate over a hinge shaft of the third clamper 191 and the first clamper 14, thereby clamping the external component of any size, ensuring a largest contacting area between the clamped external component and the second clamper and the third clamper, and further stably fixing the clamped external component and the second clamper 15 and the third clamper 191.

In order to enlarge the rotation angle of the third damper 191, that is, enlarge the adjustable distance between the third damper 191 and the second damper 15, prevent the third damper 191 from interfering with the first damper 14 in the rotation, in a preferable embodiment, a size of the through hole 144 defined in the first damper 14 is greater than that of the second cylinder body 196 to provide a space required for the up and down of the second cylinder body 196.

In another specific embodiment, the adjusting assembly 19 includes a third damper, a first screw rod, a second nut. A middle portion of the third damper is hinged to the second end of the first damper, a part of the third damper is located under the first damper (as shown in the above embodiment); a first end of the first screw rod is fixed to the second nut (as shown in the above embodiment), a first threaded hole conforming to the first screw rod is defined in the first damper, a second end of the first screw rod is fixed to the part of the third damper located under the first damper. In a preferable embodiment, the second end of the first screw rod is fixed to a position at the third damper adjacent to an end portion of the third damper. When the second nut is turned, the first screw rod moves along an axis of the first threaded hole and thus drives the third damper fixed to the first screw rod to rotate over a hinge shaft of the third damper and the first damper, thereby clamping the clamped external component of different size, ensuring a largest contacting area between the clamped external component and the second damper and the third damper, and further stably fixing the clamped external component and the second damper 15 and the third damper 191.

In yet another embodiment, the adjusting assembly 19 includes a third damper, a torsion spring, a first screw rod, and a second nut; a middle portion of the third damper is hinged to the second end of the first damper, and a part of the third damper is located under the first damper (as shown in the above embodiment); the torsion spring is formed at the hinge position of the third damper and the first damper and applies a downward force to the part of the third damper which is not located under the first damper, thus, the part of the third damper which is located under the first damper has a trend of moving upwards; a first end of the first screw rod is fixed to the second nut (as shown in the above embodiment), a first threaded hole engaging with the first screw rod is defined in the first damper, and a second end of the first screw rod abuts the part of the third damper which is located under the first damper, that is, the first screw rod always prevents the part of the third damper which is located under the first damper from moving upwards. Preferably, the second end of the first screw rod abuts a position in the third damper adjacent to the end thereof. When the second nut is loosened, the first screw rod moves upwards along an axis of the first threaded hole; at this time, the third damper rotates over a hinge shaft of the third clamper and the first damper under the action of the torsion spring (the part of the third damper which is located under the first damper moves upwards and the part of the third damper which is not located under the first damper moves downwards), thereby clamping the external component of any size, ensuring a largest contacting area between the clamped external component and the second damper and the third clamp component, and further stably fixing the clamped external component and the second damper and the third damper. When the second nut is tightened, the first screw rod moves downwards along the axis of the first threaded hole and overcomes the force applied to the part of the third damper which is not located under the first damper from the torsion spring, at this time, the third damper rotates over a hinge shaft of the third damper and the first damper (the part of the third damper which is located under the first damper moves downwards and the part of the third damper which is not located under the first clamper moves upwards), thereby clamping the external component of any size, ensuring a largest contacting area between the clamped external component and the second damper and the third clamp component, and further stably fixing the clamped external component and the second damper and the third clamp component.

In order to allow the third damper 191 of the above three embodiments to be applicable in different scenes, the third damper 191 can be designed to have a planar structure, an arch structure, or to have any particular shape, which is not limited herein.

In order to protect the clamped external component from damages such as scratches, in a preferable embodiment, a flexible rubber pad is formed on the surface of the third damper 191 opposite to the second end of the second damper 15, or the third damper 191 can be made of flexible material.

The second fastening assembly of the above embodiments includes a third nut 161 and a connection member 162. The connection member 162 includes a second screw rod 1621 and a third cylinder body 1622. An annular ring 1623 is formed on a head portion of the second screw rod 1621, and the third cylinder body 1622 is inserted in the annular ring 1623 of the second screw rod 1621. A cross hole 153 is defined in the second damper 15 for receiving the head portion of the second screw rod 1621, an elongated hole 145 is defined in the first damper 14, and the connection member 162 passes through the cross hole 153 and the elongated hole 145 sequentially to engage with the third nut 161 to screw the first damper 14 and the second damper 15 together. By the second fastening assembly having the above structure, the distance between the first end of the first damper 14 and the first end of the second damper 15 and the distance between the second end of the first damper 14 and the second end of the second damper 15 are adjustable, that is, the distance between the first end of the first damper 14 and the first end of the second damper 15 can be unequal to the distance between the second end of the first clamper 14 and the second end of the second damper 15, which ensures that the second ends of the first damper 14 and the second damper 15 can clamp the external component of different size, ensures that the connection assembly 3 can be stably clamped between the first end of the first damper 14 and the first end of the second damper 15, and ensures that the external component can be stably clamped between the second end of the first damper 14 and the second end of the second damper 15.

In a preferable embodiment, the second fastening assembly further includes a second gasket pad 163. The connection member 162 passes through the cross hole 153, the elongated hole 145, and the second gasket pad 163 in this order to engage with the third nut to screw the first damper 14 and the second damper 15 together. When the third nut 161 is separated from the connection member 162, the second gasket pad 163 of the above embodiment can prevent the third nut 161 from being separated from the connection member 162.

The fixing assembly is not limited to being clamped onto the external component. In other alternative embodiments, the fixing assembly can be absorbed onto the external component, and the fixing assembly in this situation includes a sucker absorbed onto the external component with the first ball head 11 being fixed to the sucker via a connection portion.

The foregoing descriptions are only preferred embodiments of the present invention and are not intended to limit the present invention. Any modification, equivalent replacement and improvement made under the spirit and principle of the present invention should be included in the protection scope thereof.

What is claimed is:

1. A camera fixing device, comprising:
  a fixing assembly fixed to an external component,
  a mounting assembly for mounting a camera; and
  a connection assembly connected between the fixing assembly and the mounting assembly;
  wherein the fixing assembly comprises a first ball head, the mounting assembly comprises a second ball head, a first end of the connection assembly comprises a first receiving space which receives the first ball head and allows the first ball head to rotate therein, and a second end of the connection assembly comprises a second receiving space which receives the second ball head and allows the second ball head to rotate therein;
  wherein the fixing assembly comprises a first clamper, a second clamper opposite to the first clamper, and a second fastening assembly screwing the first clamper and the second clamper together; the first ball head is fixed on the first clamper via a connection portion, and the second clamper is hinged to the first clamper at the connection portion.

2. The device of claim 1, wherein the connection assembly comprises a first connection block, a second connection block opposite to the first connection block, and a first fastening assembly screwing the first connection block and the second connection block together; a first slot and a second slot are respectively formed in two ends of the first connection block, a third slot and a fourth slot are respectively formed in two ends of the second connection block, the third slot engages with the first slot to define the first receiving space, and the fourth slot engages with the second slot to define the second receiving space.

3. The device of claim 2, wherein there exists one or more of the following: a first U-shaped opening being formed in at least one of the first slot and the second slot of the first connection block, and a second U-shaped opening being formed in at least one of the third slot and the fourth slot of the second connection block.

4. The device of claim 2, wherein a wall of at least one of the first slot and third slot is provided with a sawtooth structure, and a wall of at least one of the second slot and the fourth slot is provided with a sawtooth structure.

5. The device of claim 2, wherein a diameter of the first ball head is equal to that of the second ball head.

6. The device of claim 2, wherein the first fastening assembly comprises a first nut, a first bolt, and a first gasket; the first bolt passes through the first connection block, the second connection block, and the first gasket in this order to engage with the first nut, thereby screwing the first connection block and the second connection block together.

7. The device of claim 1, wherein the fixing assembly comprises a third ball head, a connection rod connecting the first ball head and the third ball head, a first clamper, a second clamper opposite to the first clamper, and a second fastening assembly screwing the first clamper and the second clamper together; a fifth slot is formed in a first end of the first clamper, a sixth slot is formed in a first end of the second clamper, and the fifth slot engages with the sixth slot to define a third receiving space which receives the third ball head and allows the third ball head to rotate therein.

8. The device of claim 7, wherein a third U-shaped opening is formed in the fifth slot of the first clamper and/or the sixth slot of the second clamper.

9. The device of claim 8, wherein a wall of at least one of the fifth slot and sixth slot is provided with a saw tooth shaped structure.

10. The device of claim 7, wherein at least one of the first ball head, the second ball head and the third ball head are hollow.

11. The device of claim 1, wherein both second ends of the first clamper and the second clamper have planar structures; or both second ends of the first clamper and the second clamper have arch structures; or the second end of the first clamper has a planar structure and the second end of the second clamper has an arch structure; or the second end of the first clamper has an arch structure and the second end of the second clamper has a planar structure.

12. The device of claim 1, wherein a flexible rubber pad is formed on at least one of opposite surfaces of the second ends of the first clamper and the second clamper.

13. The device of claim 1, wherein a length of the first clamper is less than that of the second clamper, and a second end of the first clamper further comprises an adjusting assembly for allowing for a largest contacting area between the fixing assembly and a clamped component.

14. The device of claim 13, wherein the adjusting assembly comprises a third clamper with a middle portion thereof being hinged to the second end of the first clamper, a first screw rod, a second nut, a first cylinder body hinged to the first clamper, and a second cylinder body hinged to a part of the third clamper which is located under the first clamper;

the first cylinder body and the second cylinder body are respectively located on opposite sides of the first clamper, a first end of the first screw rod is fixed to the second nut, a second threaded hole conforming to the first screw rod is defined in the first cylinder body, a second end of the first screw rod is fixed to the second cylinder body, and a through hole through which the first screw rod passes to be fixed to the second cylinder body is defined in the first clamper.

15. The device of claim 14, wherein the through hole is greater than the second cylinder body.

16. The device of claim 14, wherein a flexible rubber pad is formed on at least one of opposite surfaces of the second ends of the first clamper and the second clamper; or, there exists one or more of the following:

a flexible rubber pad being formed on the surface of the third clamper opposite to the second end of the second clamper, and the third clamper being made of flexible material.

17. The device of claim 13, wherein the adjusting assembly comprises a third clamper with a middle portion thereof being hinged to the second end of the first clamper, a torsion spring, a first screw rod, and a second nut; the torsion spring is formed at the hinged position of the third clamper and the first clamper to apply a downward force to a part of the third clamper which is exposed above the first damper; a first threaded hole conforming to the first screw rod is defined in the first damper; a first end of the first screw rod is fixed to the second nut, and a second end of the first screw rod abuts a part of the first clamper which is right located under the first clamper.

18. The device of claim 1, wherein the second fastening assembly comprises a third nut and a connection member; the connection member comprises a second screw rod having an annular ring on one end thereof and a third cylinder body inserted into the annular ring; a cross hole is defined in the second clamper, an elongated hole is defined in the first clamper, the connection member passes through the cross hole and the elongated hole to engage with the third nut, thereby screwing the first clamper and the second clamper together.

19. The device of claim 1, wherein the fixing assembly comprises a sucker connected to an external component, the first ball head is formed on the sucker via a connection portion.

* * * * *